United States Patent [19]

Cowan

[11] 4,054,983

[45] Oct. 25, 1977

[54] HELICAL SPRING RETRACTING TOOL

[76] Inventor: Arnold Cowan, 5330 Yarmouth Ave., Apt. 112, Encino, Calif. 91316

[21] Appl. No.: 688,160

[22] Filed: May 20, 1976

[51] Int. Cl.² ........................................... B23P 19/04
[52] U.S. Cl. .................................................... 29/227
[58] Field of Search ................ 29/227, 225, 219, 220, 29/270, 272, 239; 81/177 D, 177 E, 3 R; 254/10.5

[56] References Cited

U.S. PATENT DOCUMENTS

| | | | |
|---|---|---|---|
| 1,441,723 | 1/1923 | Dewey | 29/220 |
| 3,187,354 | 6/1965 | Frisbie | 7/14.1 R |
| 3,580,544 | 5/1971 | Payne | 29/239 |
| 3,760,656 | 9/1973 | Veach | 81/3 R |

FOREIGN PATENT DOCUMENTS 327,894  3/1934  Germany ............................. 29/220

Primary Examiner—James L. Jones, Jr.
Attorney, Agent, or Firm—Mahoney, Schick & Cislo

[57] ABSTRACT

A simple plate-like tool, having a U-shaped slot in one end thereof with means for positioning a handle for rotative movement of the tool once the tool has been positioned between adjacent windings of a helical spring, which by rotation of the tool, compresses or decompresses the tool in an easy and efficient manner.

5 Claims, 7 Drawing Figures

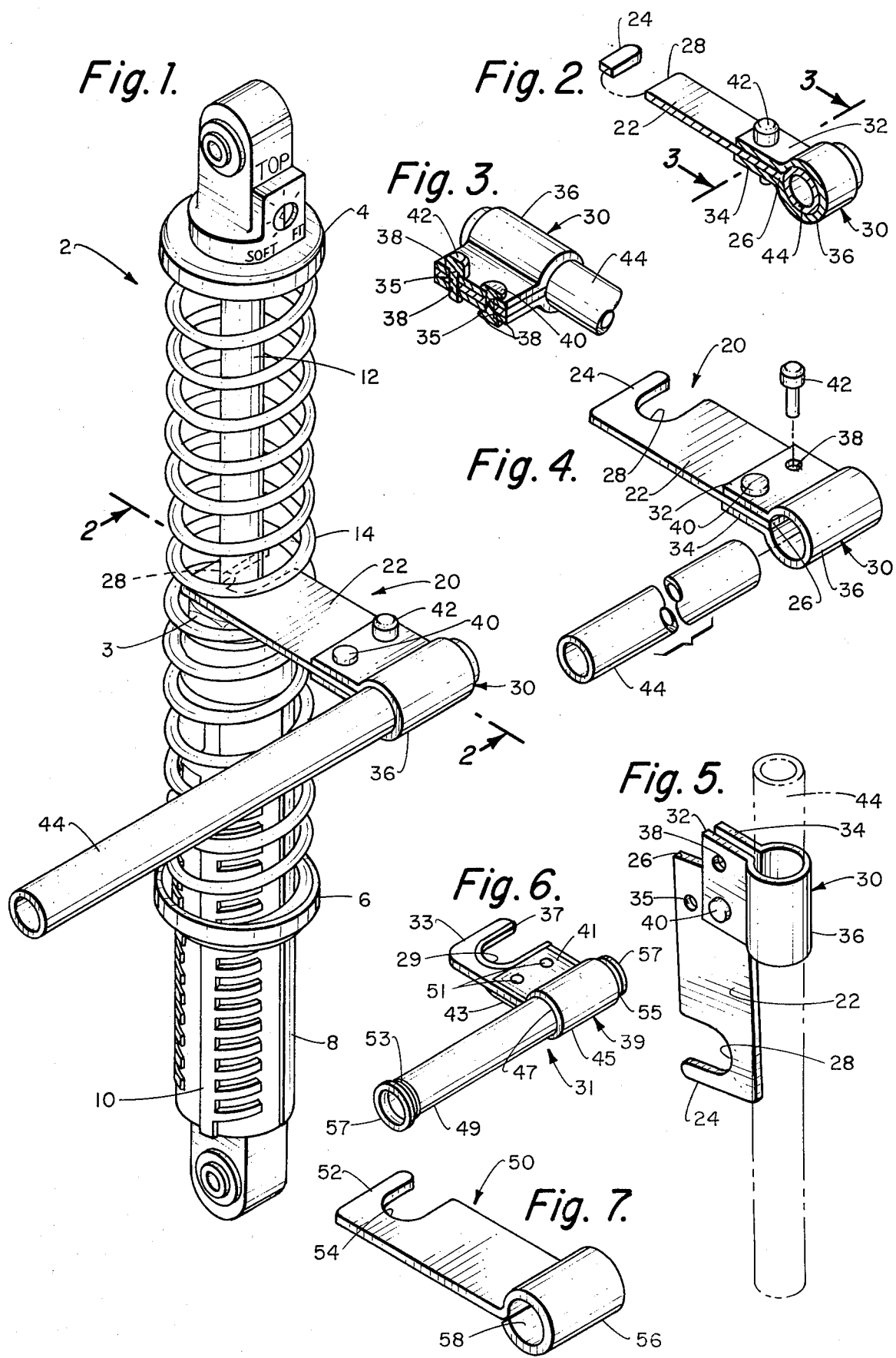

HELICAL SPRING RETRACTING TOOL

BACKGROUND OF THE INVENTION

Recently with the popularity of off track motorcycling, motorcycle manufacturers have had to cater to the needs of the motorcycle enthusiast in providing sophisticated shock absorbers which are selectively controllable so as to permit use of the motorcycle not only for off road use but also for on road use.

The usual and conventional shock absorber of the type found for use in motorcycles generally has an outer helical spring in its structure which in most instances is adjustable so as to vary the pre-load forces of the spring in order to accommodate the variance in responses to which the absorber is subjected and in many instances, it is necessary to compress or decompress a spring in such a shock absorber in order to have more or less damping as the user may require.

Some of the shock absorbers in the prior art, particularly those disclosed in U.S. Pat. No. 3,848,710 for SHOCK ABSORBER, issued Nov. 19, 1974, illustrate adjustable helical spring devices. In the type of shock absorber disclosed in the aforesaid patent, a pair of retaining rings is utilized in order to position the helical spring in secure fashion. The lower retaining member, in the normal position in which the shock absorber is utilized, is adjustable over a portion of its length and even in other shock absorbers where the retaining members for the helical spring are adjustable through various modes, it becomes necessary in order to make the adjustment to the helical spring to, in the first instance, compress the spring so as to take the load off the movable retaining member so that it may be moved longitudinally of the axis of the shock absorber in order to vary the pre-load on the helical spring.

With the herein disclosed invention, a simple, safe and effective tool is provided which provides ease of compressing in the first instance, a helical spring, whether it is right hand wound or left-hand wound, so as to be able to relocate the one retaining member against which the helical spring bears when in proper use.

The tool of this invention is compact, economically manufactured and essentially trouble free in operation. By simply inserting the tool along a rod or other axle normally making up the shock absorber structure, intermediate adjacent windings of the helical spring and by the utilization of a leverage means such as a handle, it is easy to obtain compression of the spring so as to relieve loads on the one adjustable spring retaining ring or clamp so that the ring may be adjusted to the selected limit in order to vary the pre-load on the spring. Once the retaining ring has been newly positioned, the tool of the invention is simply backed down or reversibly rotated to bring the spring to bear against the retaining ring or clamp.

OBJECTS AND SUMMARY OF THE INVENTION

It is an object of the invention to provide a helical spring retracting tool.

It is another object of the invention to provide a simple, mechanically trouble free tool for utilization in compressing and decompressing helical springs.

It is still another important object of the invention to provide a simple helical spring retracting tool wherein the tool comprises a laterally extending plate-like member having means for retention within a shock absorber between adjacent windings of a helical spring which, effeciently upon rotation thereof, acts to compress the spring and which upon opposite rotation thereof, acts to decompress the spring.

It is another still more important specific object of the invention to provide a tool for retracting either right or left hand wound helical springs wherein the tool is compact, simple in manufacture and essentially trouble free in use.

It is another still more important object of the invention to provide a helical spring retracting tool which is safe to use in retracting helical springs, especially those circumscribing an axle, shaft or the like.

In an exemplary embodiment, the invention is directed to a helical spring retracting tool comprising a laterally extending plate-like member, having a first end and opposed second end, said first end having a U-shaped slot near the terminus thereof, said U-shaped slot being adapted to receivably accommodate in retained position, a shaft or the like, and means on said second end for receiving a leverage handle whereby said plate-like member may be rotated about an axis lying in said U-shaped slot, intermediate adjacent windings of a helical spring to thereby compress or decompress said helical spring.

These and other objects of the invention will become apparent from reference to the herein following commentary taken in conjunction with the drawing.

BRIEF DESCRIPTION OF THE DRAWING

FIG. 1 illustrates in perspective view one embodiment of the tool of the invention in conjunction with a shock absorber and included helical spring;

FIG. 2 is a view taken along the line 2—2 of FIG. 1;

FIG. 3 is a view taken along the line 3—3 of FIG. 2;

FIG. 4 is a perspective, exploded view of the tool illustrated in FIG. 1;

FIG. 5 is a view of the tool of the invention depicted in FIG. 4 shown in the closed or knocked down position;

FIG. 6 illustrates an alternate embodiment of the retracting tool of this invention; and FIG. 7 illustrates still another embodiment of the invention.

DESCRIPTION OF THE BEST EMBODIMENTS CONTEMPLATED

Referring to the drawings wherein like numerals of reference designate like elements throughout and referring specifically to FIG. 1 there is illustrated a typical shock absorber 2 having in its construction a top spring retaining member 4 and a bottom spring retaining member 6. In the particular shock absorber 2 illustrated, the bottom spring retaining member 6 is positionable along the length of the bottom casting 8 by means of the plurality of ribs 10.

While the instant invention will be described with specific reference to a helical spring in conjunction with a shock absorber, it should be understood that the tool of the invention has application to any type of mechanism utilizing a helical spring, having end retaining members which permit varying the pre-tensioning or load on the spring. That is, the invention is not to be delimited to its utilization with respect to shock absorbers in that the invention finds application with regard to any helical spring, especially encompassing a shaft or rod which would require compression or decompression.

In the shock absorber 2, the conventional axle or shaft 12 is found encompassed by helical spring 14. In order to adjust the tension of helical spring 14, it is necessary to take the spring load off of retaining ring 6 so that it may be adjusted along the casing 8 by means of any one of the plurality of positioning ribs 10. In order to achieve compression of the spring 14, the retracting tool 20 of the invention finds application.

The retracting tool 20 in one embodiment comprises a plate-like laterally extending member 22 having a first end portion 24 and opposed end portion 26. A U-shaped slot 28 is provided near the terminus of end 24 of plate 22. The U-shaped slot 28 is ideally of sufficient width and depth to receive, for example, the shaft or rod 12 of shock absorber 2.

Secured to the end 26 of plate member 22 is handle means 30 comprising two parallel plates 32 and 34 with integral knuckle portion 36. Two spaced holes, 35, are made in plate number 22 so as to be in alignment with the apertures 38 in top and bottom plates 32 and 34 respectively of handle means 30. A rivet 40 secures the plate 22 to handle means 30 so that the plate 22 may pivot thereabout as shown in FIG. 5.

A pin 42 of friction fitting character is provided so as to be insertable into the bore 38 and hole 35 opposite the rivet 40 so as to provide rigid securement and non-pivotal securement between handle means 30 and plate member 22 for use as shown in FIG. 1.

For compactness of the helical spring retracting tool 20, the pin 42 is removable so that the plate member 22 assumes a folded down or knocked down position approximately 90° from its working position as illustrated in FIG. 1 and the knocked down position being shown in FIG. 5.

The knuckle portion 36 of handle means 30 is circular in configuration and is adapted to receive handle member 44, which may be of any desired length, depending upon the leverage necessary in order to compress, for example, helical spring 14 illustrated in FIG. 1. Handle member 44 is selectively positionable and removable.

FIG. 6 illustrates an alternative embodiment of the inventive tool of this invention wherein the tool 29 comprises a plate portion 33 having a U-shaped slot 35, (in this instance having a rubberized layer or coating 37 to prevent marring or scratching of the shaft 12, for example, of a shock absorber) riveted to knuckle member 39 having two spaced plate-like portions 41 and 43 with interconnected circular portion 45 forming an annular bore 47 in which is captively secured handle member 49. Rivets 51 secure plate portion 33 to knuckle member 39.

Handle member 49 in this instance is a short length of tube having flared ends 53 and 55 which prevents removal thereof from association with the bore 47 but permits shiftable movement therein. Plastic cap members 57 may be inserted in the ends of the flared ends 53 and 55.

Referring to FIG. 7, still another alternative construction of the retracting tool of this invention is illustrated. Herein, the tool 50 again comprises a first end portion 52, a U-shaped slot 54 but having an end portion 56 which is integral and is symmetrically curled, as in a metal forming process, so as to form a handle retaining aperture or bore 58 of sufficient size to accommodate, for example, the handle member 44.

The tool of the invention is preferably made of high strength steel of sufficient thickness and strength in order to assume the load to which the tool is subjected and such matters will be obvious to those of ordinary skill in the art, keeping in mind the size and strength of the particular helical spring which is desired to be acted upon.

Referring to FIG. 1, it should be apparent how any of the disclosed tools are utilized in order to compress either a right hand wound or lefthand wound spring. For example, referring to FIG. 1, the tool 20 is inserted between adjacent windings of helical spring 14 so that the shaft or rod 12 is positioned within the U-shaped slot 28. The handle 44 is inserted in the knuckle 36 and because of the shoulder 3 making up the shock absorber 2 may rest thereagainst and is in position for rotation and which rotative movement causes the helical spring 14 to compress to thereby relieve the spring loads on bottom spring retainer cup or member 6. Once the helical spring 14 has been compressed sufficiently to reposition the lower retaining ring 6 in a selective position, the tool 20 is reversibly rotated by means of handle 44 to reposition the helical spring 14 with regard to bottom spring retaining member 6. There has thereby been achieved a change in the pre-load or tension of the spring in an easy, safe and eonomical manner not requiring sophisticated tooling or tools that would be dangerous.

While the invention has been described with respect to specific applications and specific details of construction, those of ordinary skill in the art will recognize certain modifications and changes, all of which will not depart from the spirit and scope of the invention as contained in the appended claims.

I claim:

1. A helical spring retracting tool comprising a laterally extending plate-like member of uniform cross-sectional thickness having a first end and opposed second end, said first end having a U-shaped slot near the terminus thereof, said U-shaped slot being oriented substantially perpendicular to the longitudinal axis of said plate-like member and adapted to receivably accommodate in retained position a shaft or the like and integral, curvilinear-configured knuckle means on said end for receiving a leverage handle whereby said plate-like member may be rotated about an axis lying in said U-shaped slot intermediate adjacent windings of a helical spring to thereby compress or decompress said helical spring, the thickness of said plate-like member being sufficient to carry relatively heavy loads subjected upon it during the helical spring compression; and a handle member carried by said means on said second end for receiving a leverage handle, said integral, curvilinear-configured knuckle means for receiving a leverage handle being an integral knuckle-like member having opposed lateral plate sections and being pivotally secured to said plate-like member.

2. The tool in accordance with claim 1 which additionally includes an aperture in said plate-like members of said knuckle member and an aligned aperture in said plate-like member having a pin member disposed therein to prevent pivotal movement between said plate-like member and said means on said second end for receiving a leverage handle.

3. The tool in accordance with claim 2 wherein upon removal of said pin member from said apertures said plate-like member pivots about said means for receiving a leverage handle so as to assume a collapsed position.

4. The tool in accordance with claim 3 including a handle means adapted to be releasably retained within said knuckle member.

5. A helical spring retracting tool comprising a laterally extending plate-like member of uniform cross-sectional thickness having a first end and opposed second end, said first end having a U-shaped slot near the terminus thereof, said U-shaped slot being oriented substantially perpendicular to the longitudinal axis of said plate-like member and adapted to receivably accommodate in retained position a shaft or the like and means on said second end for receiving a leverage handle whereby said plate-like member may be rotated about an axis lying in said U-shaped slot intermediate adjacent windings of a helical spring to thereby compress or decompress said helical spring, and including a handle shiftably disposed in said means on said second end for receiving a leverage handle.

* * * * *